United States Patent [19]

Takahashi

[11] Patent Number: 5,592,546
[45] Date of Patent: Jan. 7, 1997

[54] MEMORY DIALING CONTROL SYSTEM HAVING IMPROVED TELEPHONE NUMBER RETRIEVAL FUNCTION BY USING HISTORY INFORMATION

[75] Inventor: Kouichi Takahashi, Kawasaki, Japan

[73] Assignee: Fujitsu Limited, Kanagawa, Japan

[21] Appl. No.: 594,384

[22] Filed: Jan. 31, 1996

Related U.S. Application Data

[63] Continuation of Ser. No. 210,234, Mar. 17, 1994, abandoned.

[30] Foreign Application Priority Data

Sep. 20, 1993 [JP] Japan ................................. 5-233106

[51] Int. Cl.$^6$ ................................................ H04M 11/00
[52] U.S. Cl. ...................... 379/355; 379/354; 379/356; 379/357
[58] Field of Search ........................... 379/354, 355, 379/356, 357, 130, 140

[56] References Cited

U.S. PATENT DOCUMENTS

| | | | |
|---|---|---|---|
| 4,908,853 | 3/1990 | Matsumoto | 379/354 |
| 4,982,432 | 1/1991 | Muroi | 379/354 |
| 5,034,976 | 7/1991 | Sato | 379/140 |
| 5,241,586 | 8/1993 | Wilson et al. | 379/130 |
| 5,267,308 | 11/1993 | Jokinen et al. | 379/354 |

*Primary Examiner*—Thomas W. Brown
*Assistant Examiner*—Jacques M. Saint-Surin

[57] ABSTRACT

A memory dialing system includes a first memory in which registered names and registered identification numbers respectively relevant to a plurality of telephone numbers are registered so that the plurality of telephone numbers may be respectively retrieved by specifying the corresponding respective names. A sort table is used for storing the identification numbers in a predetermined order with respect to the first letters in the spellings of the names. A history telephone-number table is provided for storing the used telephone numbers in a order in which the used telephone numbers have been used. A history identification-number table is also used for storing used identification numbers among the registered identification numbers respectively relevant to the used telephone numbers in an order in which the used telephone numbers have been used. A frequency table is used for storing the used identification numbers in an order with respect to the frequencies which the used telephone numbers have been used.

1 Claim, 5 Drawing Sheets

FIG. 4A

| No. | NAME | TELEPHONE NUMBER |
|---|---|---|
| 1 | AB | 1234 |
| 2 | BCD | 1233 |
| 3 | ABC | 4321 |
| ⋮ | ⋮ | ⋮ |
| N | | |

| | IDENTIFICATION NUMBER |
|---|---|
| A | No. 1 |
| A | No. 3 |
| B | No. 2 |
| ⋮ | ⋮ |
| Z | |
| ア | |
| ⋮ | |
| ワ | |

| | NAME | TELEPHONE NUMBER |
|---|---|---|
| CURRENT TIME | ABC | 4321 |
| PRECEDING TIME | BCD | 1233 |
| FURTHER PRECEDING TIME | BCD | 1233 |
| ⋮ | ⋮ | ⋮ |
| | | |

| | IDENTIFICATION NUMBER |
|---|---|
| LATEST | No. 3 |
| | No. 2 |
| ⋮ | ⋮ |
| EARLIEST | |

| | | FREQUENCY |
|---|---|---|
| MOST FREQUENTLY USED | No. 2 | 35 |
| SECOND MOST FREQUENTLY USED | No. 3 | 10 |
| ⋮ | ⋮ | ⋮ |
| LEAST FREQUENTLY USED | No. j | 2 |

19

5,592,546

MEMORY DIALING CONTROL SYSTEM HAVING IMPROVED TELEPHONE NUMBER RETRIEVAL FUNCTION BY USING HISTORY INFORMATION

This is a continuation of application Ser. No. 08/210,234, filed Mar. 17, 1994, abandoned.

BACKGROUND OF THE INVENTION

1. Field of the Invention

The present invention relates to a memory dialing control system used in a communication terminal such as a telephone set, in which system the telephone numbers of remote terminals have been previously registered and the thus registered telephone numbers are desired to be read out to be used for calling.

In such a system, a memory dialing procedure may be used in which the remote terminals' names and telephone numbers have been previously registered in a memory. The system provides a service in which the thus registered remote-terminal names may be searched for in an order according to the first letters in the name spellings such as the alphabetical order or the like. Inputting of the first letter in a desired remote-terminal name causes the relevant remote-terminal telephone numbers to be displayed together with the names successively. If the desired name has been displayed as the result of the thus successive displaying, the relevant telephone number may be used for the calling. A certain system such as that enables efficient use of memory dialing procedure to be effectively used.

2. Related Art

With reference to FIG. 1, a memory dialing control system in the related art is described. The system comprises a control section 31; a transmission/reception controller 32; a display/operation unit 33; and a memory 34. The memory 34 includes a memory dialing area 35 and a sort table 36. The control section includes a processor (CPU) 40; a read only memory (ROM) 41 for storing programs; a random access memory (RAM) 42 for temporarily storing various data; and interface units 43 and 44.

The control section 31 controls writing data into and reading data out from the memory dialing area 35 and produces the sort table 36 by using the contents registered in the memory dialing area 35. The control section 31 also controls the transmission/reception controller 32 via the interface unit 43 so as to send a remote-terminal telephone number when calling and respond to a call from a remote terminal either automatically or in response to an off-hook action through either the display/operation unit or a handset not shown.

The display/operation unit 33 is connected with the processor 40 via the interface unit 44. The display/operation unit 33 includes a display device such as a liquid crystal display device and an operation specification device including a ten-key keypad. The transmission/reception controller 32 is connected with a switched network via a communication line and connected with remote communication terminals via the switched network. Thus, telephone speaking and data communication are achieved.

The memory dialing area 35 registering operation is described. In one example, a remote-terminal name and telephone number pair may be input by the operator through the display/operation unit 33, the thus input name and number pair is then displayed on the display device. Then, the operator may specify the registering thereof after acknowledging them so that via the control section 31 the relevant name and number pair is written into the memory dialing area 35. Such a process may be repeated for desired remote terminals so that the plurality of relevant name and telephone number pairs are registered in the memory dialing area 35. Each name and telephone number pair has an identification number which has been given in the order in which the name and telephone number pairs have been registered. Then, the control section 31 searches the memory dialing area 35 for the thus registered names by using the first letters in the name spellings so as to produced the sort table 36.

In a case, for example where the alphabetical sort table is produced, the name having the first letter 'A' is searched for. The identification number relevant to the thus retrieved name is written into the 'A' area in the sort table 36. Next, the name having the first letter 'B' is searched for. The identification number relevant to the thus retrieved name is written into the 'B' area in the sort table 36. Such a process is executed for other letters of the alphabets so as to retrieve all the names stored in the memory dialing area 35. As a result, the identification numbers relevant to the names are stored in the sort table 36 in the alphabetical order.

After the sort table 36 has been thus produced by the processing by the control section 31, a memory dialing operation is performed as described below. The letter 'A' for example is input through the display/operation unit 33 so that the system must search accordingly. The control section 1 as a result accesses the 'A' area in the memory dialing area 35 so as to read the relevant identification number therefrom. The thus read identification number is used for accessing the relevant address in the memory dialing area 35 so that the relevant name and telephone number can be read and displayed on the display device of the display operation unit 33. If the operator finds that the thus displayed name does not comprise the desired one, the operator may input an instruction indicating a next candidate retrieval operation to be performed on the 'A' area. As a result, the next candidate identification number is read out and the relevant name and telephone number are accordingly read out from the memory dialing area 35. The thus read name and telephone number are then displayed on the display device of the display/operation unit 33. Thus, the operator may search for the names and telephone numbers registered in the memory dialing area 35 with simple operations. Another searching manner may be applied to the search in which the registered names and telephone numbers will be displayed in the order in which they have been registered. Another searching manner may be applied to the search in which the desired name itself is input and the telephone number relevant to the thus input name is displayed as a result of determination whether the input name corresponds to a name registered in the memory dialing area 35.

After the desired name is displayed as a result of the above described processing, the operator may specify through the display/operation unit 33 an instruction for the calling operation to be performed. The control section 31 as a result transfers the telephone number currently read from the memory dialing area 35 to the transmission/reception controller 32 so as to cause the controller 32 to control the switched network so as to achieve the calling properly.

The above system eliminates an operator's manual dialing input operation of a telephone number for each communication operation by using the name-and-telephone-number search function through the previously registered relevant information concerning the remote terminals. However, problems may occur as a result of the search method. In a case where a desired name and telephone number pair is one of many entries under the same alphabetical index and the desired pair is located at a position among the entries at which the pair may be retrieved only after many other entries are searched. Thus, a considerable time may be required for the search even if the relevant desired information is frequently used. Further, if the same remote terminal is again needed for other communication, the same memory dialing process including the information search must be performed again, the relevant operation thus being cumbersome.

SUMMARY OF THE INVENTION

An object of the present invention is to improve the memory dialing operation efficiency.

The principle of a memory dialing control system according to the present invention is described with reference to FIG. 2. The memory dialing control system comprises control section 1 for controlling system constituents described below; transmission/reception controller 2 for performing transmission/reception control operation as a result of connecting the system to communication lines; display/operation unit 3 for display and input operations; and memory 4. The memory 4 includes a memory dialing area 5 for registering therein remote-terminal name and telephone number pairs, in the order of the time the respective pairs have been registered, together with respective identification numbers relevant to the respective pairs (the identification numbers are assigned to the respective information pairs according to the historical sequence in which the pairs are registered therein); sort a table 6 for storing therein the above identification numbers in the alphabetical order with respect to the respective registered names; a transmission/reception history area 7 for storing therein information including the remote-terminal telephone numbers used for the transmission/reception operations using the memory dialing method; transmission/reception order table 8 for storing therein information concerning the order in time in which respective pairs have been used for the transmission/reception operations using the memory dialing method; and an usage frequency order table 9 for storing therein information concerning the frequencies with which the respective pairs have been used in the transmission/ reception operations using the memory dialing method. (The alphabetical order applied to the above sort table 6 may be replaced by or added to with another order such as the Japanese alphabetical order, I, RO, H4, NI, HO, HE, TO, . . . or A, I, U, E, O, . . . both being represented using Roman letters, the Japanese word for the Roman alphabet or the like.). The control section 1 receives a search request input through the display/operation unit 3 from the operator. The operator may instruct as to the method applied to the input search request, which method may be to use the transmission/reception history information, transmission/reception order information or frequency information. As a result, the control section 1 searches the transmission/reception history area 7, transmission/reception order table 8 or usage frequency order table 9 in the memory 4 accordingly. Thus, the control section 1 obtains an appropriate identification number as a result of the above searching operation and reads out the relevant remote-terminal name and telephone number pair from the memory dialing area 5 using the thus obtained identification number. The control section 1 displays the thus obtained name and telephone number pair through the display/operation unit 3.

The control section 1 controls the system so that at least a remote-terminal telephone number used in a transmission/ reception operation performed in the system may be stored in the transmission/reception history area 7 on each transmission/reception occasion.

The control section 1 controls the system so that the identification number associated with a telephone number used for calling may be stored in the transmission/reception order table 8. This storing operation is performed in a case where the relevant calling is made using the telephone number previously registered in the memory dialing area 5 and the relevant identification number to be stored comprises one previously stored in the memory dialing area 5.

The control section 1 controls the system so that identification information such as the identification number associated with a telephone number used for the calling may be stored in the usage frequency order table 9. This storing operation is performed in a case where the relevant calling is made using the telephone number previously registered in the memory dialing area 5 and the relevant identification number to be stored comprises one previously stored in the memory dialing area 5. Further, the usage frequencies associated with the thus stored identification information relevant to the information pairs may be stored in the usage frequency table 9, the usage frequencies being obtained as a result of counting the calls associated with the respective telephone numbers. Further, the identification information may be arranged in the order of the thus stored usage frequencies in the table 9.

The registration of the remote-terminal name and telephone number pairs in the memory dialing area 5 is performed through the display/operation unit 3 or the like under the control of the control section 1. The control section 1 then produces the sort table 6 by appropriately searching the memory dialing area 5. The control section 1 also writes relevant transmission/reception remote-terminal name and telephone number in the transmission/reception history area 7 on every transmission/reception occasion. The control section 1 also writes, in the transmission/reception order table 8, a relevant telephone number or identification number every time a telephone number read from the memory dialing area 5 is used for calling. The control section 1 also writes the above-mentioned usage frequencies in the usage frequency order table 9.

A remote terminal name to be used may be retrieved as follows: In a first method, the sort table 6 is used so that the identification numbers arranged in the sort table 8 may be sequentially read and the thus read numbers may be used so that the name and telephone number pairs registered in the memory dialing area 5 may be sequentially displayed on a display device of the display/operation unit 3. It is also possible to search for name and telephone number using history information concerning the preceding transmission/ reception and/or the further preceding transmission/reception. For this retrieval, the contents stored in the transmission/reception history area 7 are sequentially read starting from the latest one and displayed on the display device of the display/operation unit 3 accordingly as a result of the operator's instruction input indicating to display the next candidate. It is also possible to search for name and telephone number using the memory-dialing-used-transmission/ reception-time order (the order of the frequencies with which transmission/receptions have been performed with the memory dialing operations, where the memory dialing operation/function means an operation/function in which the telephone number stored in a memory is used for calling so that the operator does not need to dial the relevant telephone number by himself or herself but needs to input simply the relevant identification number or the like.). For this retrieval, the contents stored in the transmission/reception order table 8 are sequentially read out starting from the latest one and displayed on the display device of the display/operation unit 3 accordingly. It is also possible to search for name and telephone number using the memory-dialing-usage-frequency order. For this retrieval, the contents stored in the usage frequency order table 9 are sequentially read starting from the highest-frequency one and displayed on the display device of the display/operation unit 3 accordingly.

The control section 1 stores either the relevant remote-terminal telephone number or telephone number and name pair in the transmission/reception history area 7 on each transmission occasion. The name to be stored may be obtained either as a result of input by means of the operator or as a result of retrieving the name from the memory dialing area 5. Also, the control section 1 stores either the relevant remote-terminal telephone number or telephone number and name pair in the transmission/reception history area 7 on each reception occasion, if the relevant remote-terminal telephone number is known. The name and telephone number to be stored may be obtained as a result of input by means of the operator through the display/operation unit 3.

The control section 1 also stores in sequence, in the transmission/reception order table 8 of the memory 4, the relevant identification number of each memory-dialing-function usage occasion, which identification numbers have been stored in the memory dialing area 5. As a result, in the starting-address storage location in the transmission/reception order table 8, the identification number relevant to the most recently used telephone number is stored.

The control section 1 also stores, in the usage frequency order table 9 of the memory 4, the relevant usage frequency corresponding to each memory-dialing-function usage occasion. The relevant storage location in the usage frequency order table 9 is one provided for the relevant identification number. The control section 1 then arranges the thus stored usage frequency information in the order of the usage frequency amount in the usage frequency order table 9. As a result, in the starting-address storage location in the usage frequency order table 9, the identification number relevant to the most frequently used remote terminal is stored. The thus stored identification numbers may be used to retrieve the relevant name and telephone number from the memory dialing area 5 and the thus retrieved name and telephone number may be then displayed on the display device of the display/operation unit 3.

Other objects and further features of the present invention will become more apparent from the following detailed description when read in conjunction with the accompanying drawings.

BRIEF DESCRIPTION OF THE DRAWINGS

FIGS. 4A, 4B, 4C, 4D and 4E show contents for example stored in a memory shown in FIG. 3.

DESCRIPTION OF THE PREFERRED EMBODIMENT

Figure 3:
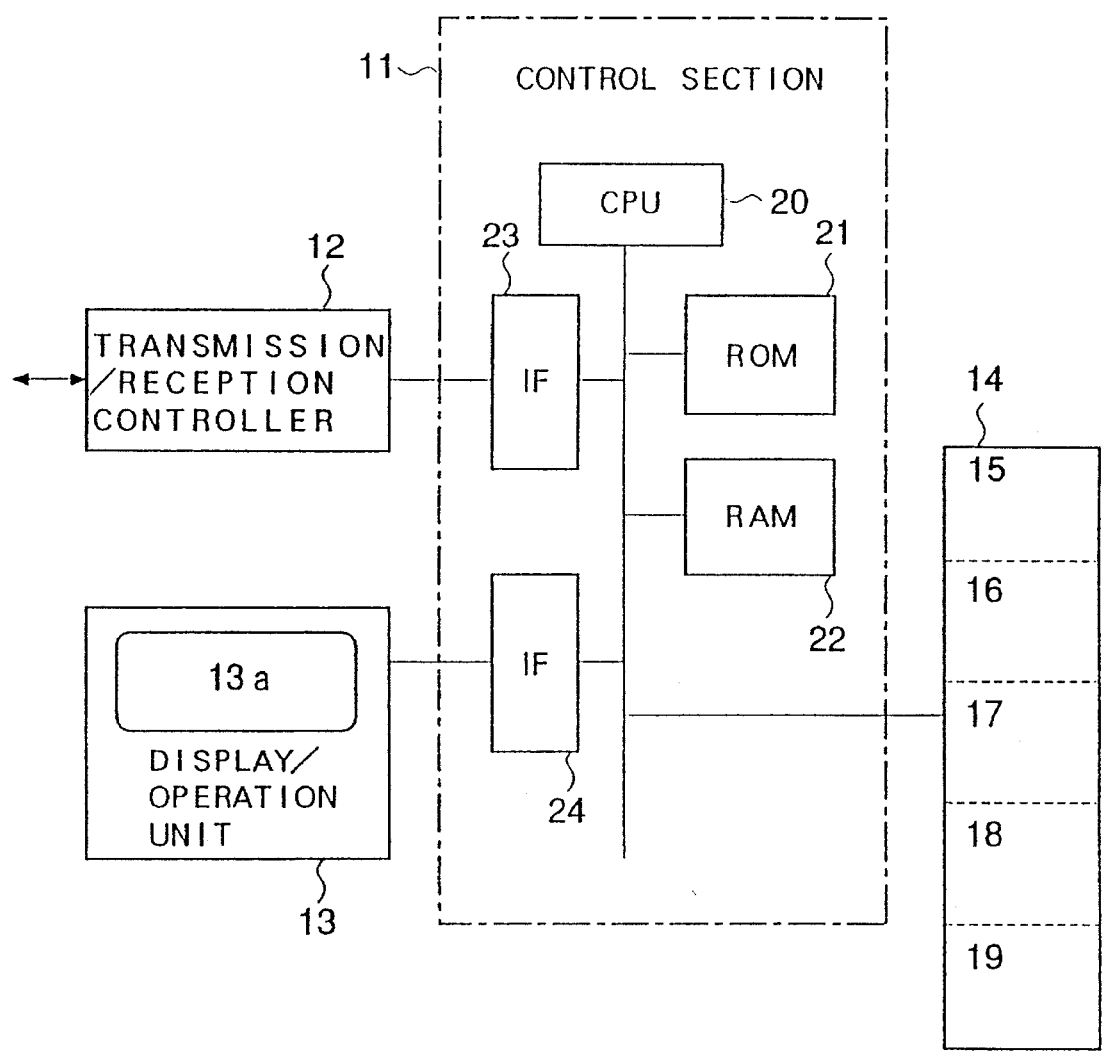
FIG. 3 shows a block diagram of a memory dialing control system embodiment according to the present invention.

With reference to FIG. 3, a communication terminal in an embodiment of a memory dialing control system according to the present invention is described. FIG. 3 shows only essential parts of the terminal. The communication terminal comprises a control section 11 including a processor (CPU) 20; a read only memory (ROM) 21 for storing programs and so forth; a random access memory (RAM) 22 for temporarily storing data and so forth; interface units (IF) 23 and 24; a transmission/reception controller 12; a display/operation unit 13 including a display device 13a; and a memory 14 including a memory dialing area 15, a sort table 16, a transmission/reception history area 17, a transmission/reception order table 18 and a usage frequency table 19.

The transmission/reception controller 12 and display/operation unit 13 are respectively connected to the control section 11 via the interface units 23 and 24. The transmission/reception controller 12 is connected to a switched network via a communication line, both not being shown in the figure. The display/operation unit 13 includes an operation input device comprising a ten-key keypad and so forth as well as the display device 13a comprising a liquid crystal display device or the like.

The memory 14 may be made of a dynamic memory provided with a back-up power source, non-volatile memory such as a write-and-erase-possible (data can be written in and also the written data can be erased) read only memory, or the like. Data writing to and reading from the memory 14 is performed by the control section 11. The information registration process to the memory dialing area 15 of the memory 14 and the process to produce the sort table 16 using the registered contents in the memory dialing area 15 are similar to those in the related-art system shown in FIG. 1.

The relevant remote-terminal name and telephone number are stored into the transmission/reception history area 17 of the memory 14, on each transmission/reception performance occasion. If the area 17 is full before the current storage operation is performed thereon, the current storage may be performed by either the following methods: The entire stored contents in the area 17 and the earliest stored contents is erased. Then, the current information (remote-terminal name and telephone number) is stored in the starting address location of the area 17. Alternatively, the current information is stored at the location at which the earliest stored contents were stored. In this alternative method, an appropriate pointer is used to indicate that the starting address is that at which the current information has been stored.

With reference to FIGS. 4A, 4B, 4C, 4D and 4E, examples of the memory dialing area 15, sort table 16, transmission/reception history area 17, transmission/reception order table 18 and usage frequency order table 19 used in the communication terminal shown in FIG. 3 are described.

In the memory dialing area 15, as shown in FIG. 4A, various names 'AB', 'BCD', 'ABC', and so forth accompanied by the relevant telephone numbers '1234', '1233', '4321' and so forth are stored in the sequence the name and telephone number pairs were registered in the memory 14. The sort table 16 is produced as a result of arranging these name and telephone number pairs in alphabetical order as shown in FIG. 4B. (In the sort table 16 of FIG. 4B, Japanese names are also arranged in the Japanese alphabetical order, A(P ) to Wa(7), in the bottom thereof.) In the sort-table-16 production, the first letter of the name is used. As shown in FIG. 4B, the actual contents in the sort table 16 are not the name and telephone number pairs themselves but the relevant identification numbers, No.1, No.3, No.2, . . . (which numbers refer to entries in the memory dialing area 15) at the lines 'A', 'A', 'B', . . . , corresponding to the registration time order 1, 3, 2, . . . in the memory dialing area 15, instead of the name and telephone number pairs, 'AB, 1234', 'ABC, 4321', 'BCD, 1233', . . .

If the operator intends to search for a name and telephone number pair using the first letters of the names, the operator should input the letter 'A' (for example). Then, the control section 11 controls the system so that the identification number No.1 at the starting address in the 'A' lines of the sort table 16 is read. The thus read identification number No.1 is then used to read the relevant name and telephone number pair, 'AB and 1234' from the memory dialing area 15. The thus read name and telephone number pair is then displayed on the display device 13a of the display/operation unit 13. Then, if the operator inputs a next candidate retrieval instruction or the like through the display/operation unit 13, the control section controls so as to cause the identification number No. 3 in the subsequent address in the 'A' lines of the sorting table 16 to be read. The thus read identification number No.3 is then used to read the relevant name and telephone number pair, 'ABC and 4321' from the memory dialing area 15. The thus read name and telephone number pair is then displayed on the display device 13a of the display/operation unit 13. Similarly, other searching operations may be performed until the desired name is displayed on the display device.

Figure 1:
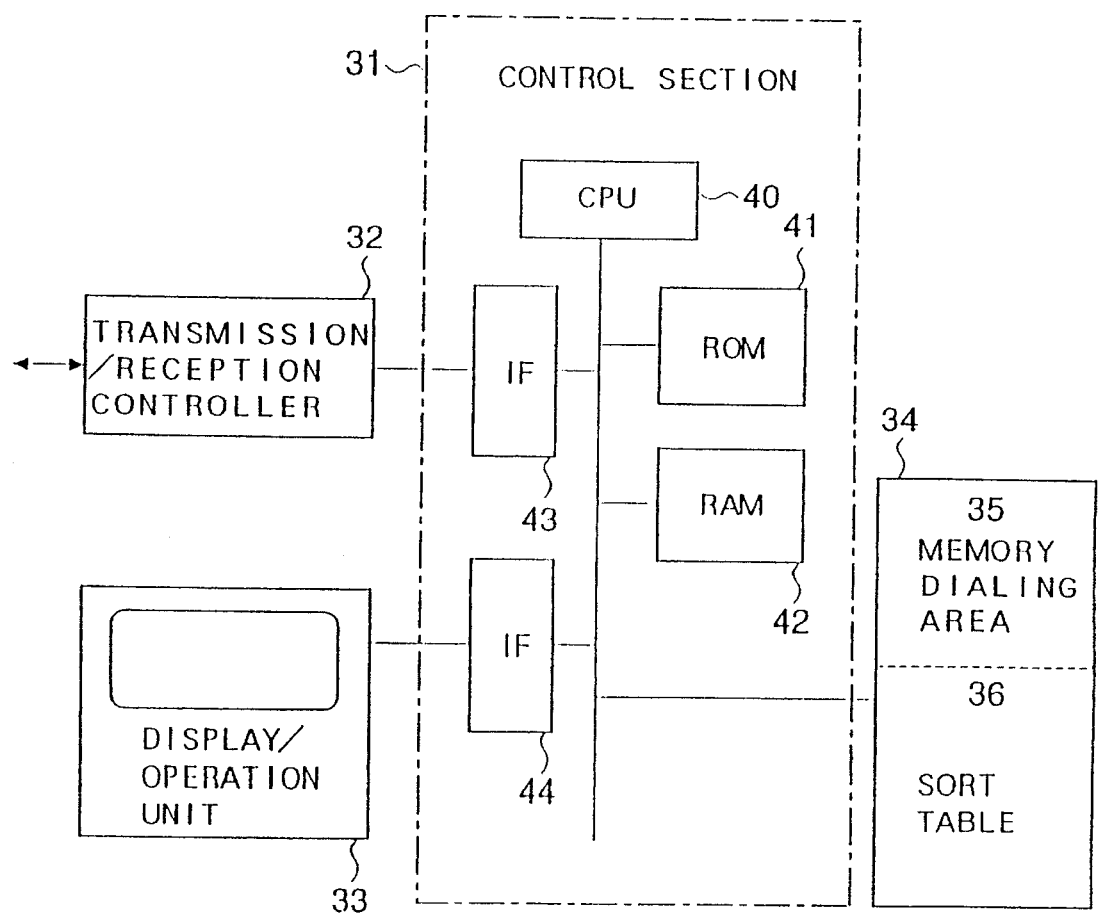
FIG. 1 shows a block diagram of a memory dialing control system in the related art.
Figure 2:
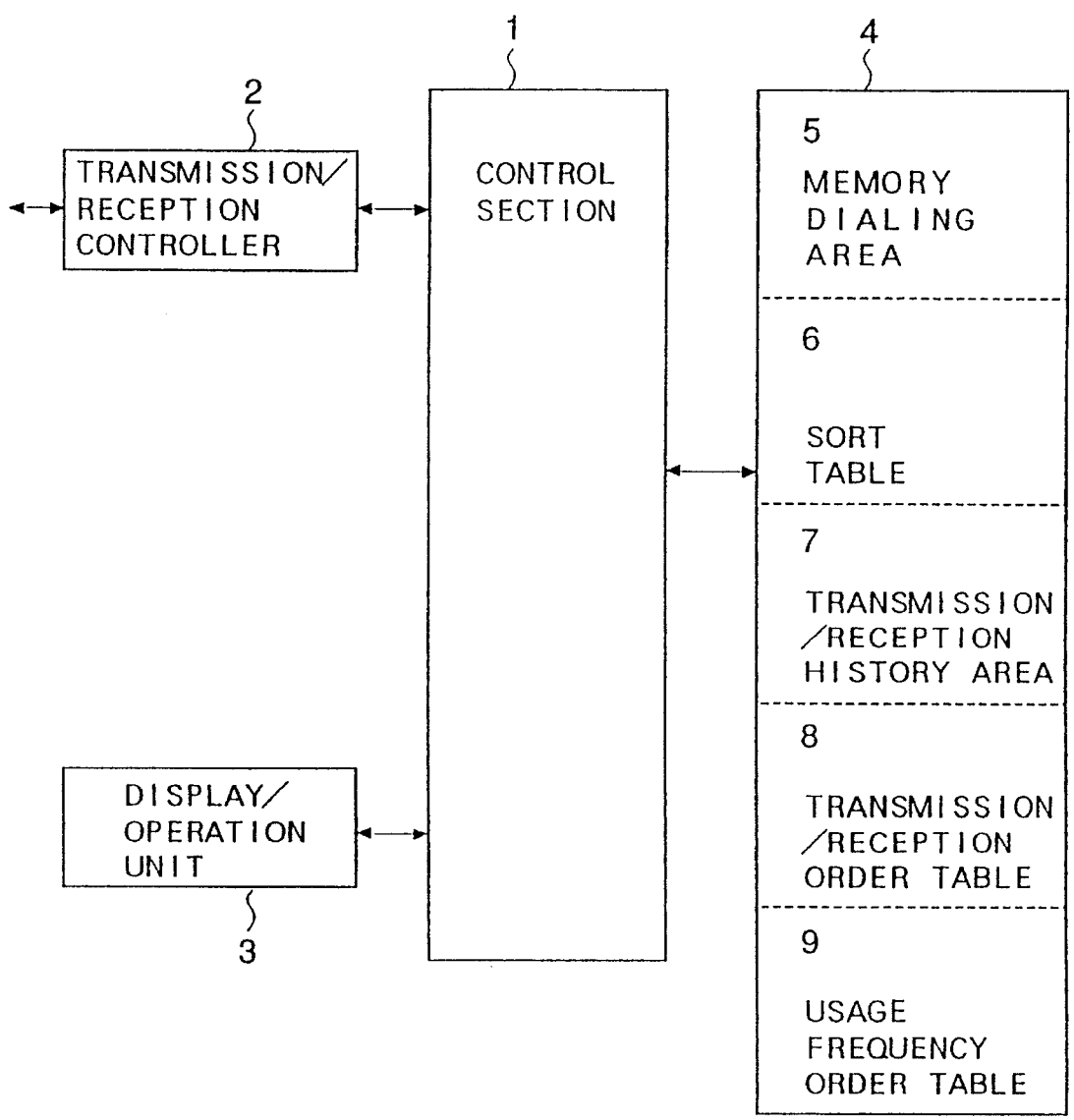
FIG. 2 shows a principle block diagram of a memory dialing control system according to the present invention.

Thus, if the desired name is displayed, in a manner similar to that of the related art system described with reference to FIG. 1, in response to the operator's instruction to perform a calling operation, the control section 11 transfers the relevant telephone number read from the memory dialing area 15 to the transmission/reception controller 12, the calling being thus performed to the switched network not shown in the figure.

The transmission/reception history area 17 is used for storing transmission/reception history comprising data as described above for a predetermined number of transmission/reception operation times. In a case where transmission operations are performed using the memory dialing function, then for example then the registered telephone number '1233' of the relevant remote-terminal name 'BCD' and then '4321' of 'ABC' may be used. As a result, the information 'BCD, 1233' as the preceding information and 'ABC, 4321' as the current information are stored in the transmission/reception history area 17 as shown in FIG. 4C.

It is also possible to perform a transmission operation without using the memory dialing function. In this case, the operator could input a remote-terminal telephone number through the display/operation unit 13. The thus input telephone number is then used to be stored in the transmission/reception history area 17. The operator's inputting of the relevant remote-terminal name as well as the thus input telephone number causes the remote name and telephone number pairs to be stored in the transmission/reception history area 17. In a case of a reception operation, the relevant remote-terminal name and telephone number cannot be automatically known in the normal analog switched network. The operator's inputting of the relevant information at the time of the relevant communication termination causes it to be stored in the area 17. Alternatively, the relevant remote-terminal name and telephone number can be automatically received via the ISDN(integrated service digital network) or through the facsimile communication. The thus received information is used to be stored in the area 17.

The transmission/reception order table 18 is used for storing experienced through-memory-dialing-function transmission/reception operation time order information (information concerning the history sequence in which transmission/reception operations have been performed through the memory dialing function) in a predetermined number of the transmission/reception operation times, using the relevant identification numbers in the memory dialing area 15. That is, the relevant identification numbers are arranged there in the experienced through-memory-dialing-function transmission/reception operation time order as shown in FIG. 4D. In the search operation using the transmission/reception order table 18, the control section 11 controls so that the identification numbers stored in the table 18 may be read in sequence starting from identification number at the starting address. The thus read identification numbers may be used to retrieve the relevant name and telephone number pairs from the memory dialing area 15. The thus retrieved pairs may be displayed on the display device 13a of the display/operation unit 13. Thus, the remote-terminal name and telephone number pairs which have been used in the memory dialing operation may be searched.

The usage frequency order table 19 is used for storing experienced through-memory-dialing-function usage frequency order information. Each usage frequency stored in the table 19 is calculated as a result of counting the number of times the memory dialing function has been used for the relevant remote-terminal telephone number. The thus obtained usage frequencies are stored in the table 19 accompanied by the relevant identification numbers in the frequency amount order. The above telephone number '1233' is assumed to have been used in the memory dialing operation 35 times, the greatest usage frequency. Thus, the relevant identification number 'No.2' and usage frequency '35' are stored at the starting address location in the table 19 as shown in FIG. 4E. In the search operation using the table 19, the control section 11 controls so that the identification numbers stored in the table 19 may be read in sequence starting from the identification number 'No.2' at the starting address. The thus read identification numbers may be used to retrieve the relevant name and telephone number pairs from the memory dialing area 15. The thus retrieved pairs may be displayed on the display device 13a of the display/operation unit 13. Thus, the remote-terminal name and telephone number pairs which have been used in the memory dialing operation may be searched.

Similarly to the automatic calling operation performed through the memory dialing function, an automatic calling operation may be performed as follows: A remote-terminal telephone number retrieved by using the transmission/reception history area 17 is used so that the control section controls the transmission/reception controller 12 to perform the automatic calling operation. Alternatively, an automatic calling operation can be performed by using a remote-terminal telephone number retrieved by using either the transmission/reception order table 18 or the usage frequency order table 19. Thus, calling operation may be easily performed in the various telephone number search manners.

It is possible that the control section 15 controls the system so that a remote-terminal name and telephone number pair, which has been multiply stored in the transmission/reception history area 17 and has not been registered in the memory dialing area 15, is made to be automatically registered in the memory dialing area 15.

Thus, in the present invention, a memory dialing calling operation may be easily performed by using memory dialing area 4, 14 and sort table 6, 16. Also, a memory dialing telephone number search operation may be efficiently performed using the transmission/reception order information or usage frequency order information. Thus, the memory dialing function may be efficiently used. The transmission/reception order table 8, 18 and usage frequency order table 9, 19 may be automatically generated under the control of the control section 1, 11. Thus, any substantial inconvenient occurring for the operator for producing these tables may be omitted.

Further, the present invention is not limited to the above described embodiments, and variations and modifications may be made without departing from the scope of the present invention.

What is claimed is:

1. A memory dialing system comprising:

a first memory including a memory dialing area for registering a plurality of telephone numbers;

a second memory for storing history information indicating how used telephone numbers among said plurality of telephone numbers have been used in both call transmitting and call receiving;

displaying means for displaying said history information read out from said second memory so that an operator may retrieve a telephone number from among said plurality of telephone numbers by using said history information displayed thereby; and control means interconnected between said first and second memory and said displaying means for controlling writing data into and reading data out from said memory dialing area, controlling writing and storing history information into said second memory on each transmission/reception occasion and controlling a displaying of said registered telephone numbers on said displaying means so that said telephone number retrieved by the operator may be dialed by the operator, wherein:

said first memory is also controlled by said control means to register therein names and identification numbers respectively relevant to said plurality of telephone numbers so that said plurality of telephone numbers may be respectively retrieved by specifying the corresponding respective names:

said second memory comprises:

a sort table for storing said identification numbers in a predetermined order according to the first letters in the spellings of said names;

a history telephone-number table for storing said used telephone numbers in the order in which said used telephone numbers have been used;

a history identification-number table for storing used identification numbers among said registered identification numbers respectively relevant to said used telephone numbers in the order in which said used telephone numbers have been used; and a frequency table for storing used identification numbers in an order according to the frequencies with which said used telephone numbers have been used.

* * * * *